US012608936B2

(12) United States Patent
Mittal et al.

(10) Patent No.: US 12,608,936 B2
(45) Date of Patent: Apr. 21, 2026

(54) PRIOR-DRIVEN SUPERVISION FOR WEAKLY-SUPERVISED TEMPORAL ACTION LOCALIZATION

(71) Applicant: Microsoft Technology Licensing, LLC, Redmond, WA (US)

(72) Inventors: Gaurav Mittal, Redmond, WA (US); Ye Yu, Redmond, WA (US); Matthew Brigham Hall, Kenmore, WA (US); Sandra Sajeev, Seattle, WA (US); Mei Chen, Bellevue, WA (US); Mamshad Nayeem Rizve, Orlando, FL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 317 days.

(21) Appl. No.: 18/325,542

(22) Filed: May 30, 2023

(65) Prior Publication Data

US 2024/0404279 A1     Dec. 5, 2024

(51) Int. Cl.
*G06V 20/40*          (2022.01)
*G06V 10/774*         (2022.01)

(52) U.S. Cl.
CPC ............ *G06V 20/41* (2022.01); *G06V 10/774* (2022.01); *G06V 20/44* (2022.01); *G06V 20/46* (2022.01)

(58) Field of Classification Search
CPC ...... G06V 20/41; G06V 20/46; G06V 10/774; G06V 20/44
See application file for complete search history.

(56) References Cited

U.S. PATENT DOCUMENTS

2013/0089304 A1 * 4/2013 Jiang ..................... G06V 20/41
                                                        386/285
2020/0302236 A1 * 9/2020 Gao .................... G06F 18/2415
(Continued)

OTHER PUBLICATIONS

Carreira, et al., "Quo Vadis, Action Recognition? A New Model and the Kinetics Dataset", In proceedings of the IEEE Conference on Computer Vision and Pattern Recognition, 2017, pp. 6299-6308.
(Continued)

*Primary Examiner* — Syed Haider
(74) *Attorney, Agent, or Firm* — Holzer Patel Drennan

(57)          ABSTRACT
A classifier model is trained for temporal action localization of video clips. A training video clip that includes actions of interest for identification is ingested into the classifier model. Action characteristics within frames of the video clip are identified. The actions correspond to known action classes. An actionness score is determined for each of the frames based upon the action characteristics identified within each of the frames. Class activation sequence (CAS) scores are determined for sequences of the frames based upon a presence or an absence of the action characteristics identified within each of the frames. Base confidence predictions of temporal locations of actions of interest within the video clip are produced by correlating each of the actionness scores with corresponding class activation scores for each of the frames in the sequences of frames. A training class of action snippets corresponding to known ground-truth actions within the video clip is generated based on the base confidence predictions. A classifier is trained with the training class to identify the actions of interest at a video level.

20 Claims, 6 Drawing Sheets

(56) References Cited

U.S. PATENT DOCUMENTS

2023/0010392 A1* 1/2023 Hsiao .................... G06V 20/49
2023/0196837 A1* 6/2023 Li ........................ H04N 19/513
                                                      382/156

OTHER PUBLICATIONS

Chao, et al., "Rethinking the Faster R-CNN Architecture for Temporal Action Localization", In Proceedings of the IEEE/CVF Conference on Computer Vision and Pattern Recognition, Jun. 18, 2018, pp. 1130-1139.

Chen, et al., "Dual-Evidential Learning for Weakly-Supervised Temporal Action Localization", In Proceedings of European Conference on Computer Vision, Oct. 28, 2022, pp. 192-208.

Duval, et al., "The TVL 1 Model: A Geometric Point of View", In Journal of Multiscale Modeling & Simulation, vol. 8, Issue 1, Nov. 11, 2009, pp. 154-189.

Guo, et al., "On Calibration of Modern Neural Networks", In Proceedings of the 34th International Conference on Machine Learning, Aug. 6, 2017, 10 Pages.

Han, et al., "Co-teaching: Robust Training of Deep Neural Networks with Extremely Noisy Labels", In Proceedings of the 32nd International Conference on Neural Information Processing Systems, Dec. 3, 2018, 11 Pages.

He, et al., "ASM-Loc: Action-aware Segment Modeling for Weakly-Supervised Temporal Action Localization", In Proceedings of IEEE/CVF Conference on Computer Vision and Pattern Recognition, Jun. 18, 2022, pp. 13915-13925.

He, et al., "Human Action Recognition Without Human", In Proceedings of the European Conference on Computer Vision, Nov. 24, 2016, pp. 11-17.

Heilbron, et al., "Activitynet: A large-scale Video Benchmark for Human Activity Understanding", In Proceedings of the IEEE Conference on Computer Vision and Pattern Recognition, Jun. 7, 2015, pp. 961-970.

Hong, et al., "Cross-Modal Consensus Network for Weakly Supervised Temporal Action Localization", In Proceedings of the 29th ACM International Conference on Multimedia, Oct. 20, 2021, pp. 1591-1599.

Huang, et al., "Foreground-Action Consistency Network for Weakly Supervised Temporal Action Localization", In Proceedings of the IEEE/CVF International Conference on Computer Vision, Oct. 10, 2021, pp. 7982-7991.

Huang, et al., "Relational Prototypical Network for Weakly Supervised Temporal Action Localization", In Proceedings of the AAAI Conference on Artificial Intelligence, vol. 34, Issue 7, Apr. 3, 2020, pp. 11053-11060.

Huang, et al., "Weakly Supervised Temporal Action Localization via Representative Snippet Knowledge Propagation", In Proceedings of the IEEE/CVF Conference on Computer Vision and Pattern Recognition, Jun. 18, 2022, pp. 3262-3271.

Idrees, et al., The Thumos challenge on action recognition for videos "in the wild", In Journal of Computer Vision and Image Understanding,, Feb. 2017, pp. 1-23.

Islam, et al., "A Hybrid Attention Mechanism for Weakly-Supervised Temporal Action Localization", In Proceedings of the AAAI Conference on Artificial Intelligence, vol. 35, Issue 2, May 18, 2021, pp. 1637-1645.

Jiang, et al., "MentorNet: Learning Data-Driven Curriculum for Very Deep Neural Networks on Corrupted Labels", In Proceedings of the 35th International Conference on Machine Learning, Jul. 3, 2018, 10 Pages.

Karim, et al., "UniCon: Combating Label Noise Through Uniform Selection and Contrastive Learning", In Proceedings of the IEEE/CVF Conference on Computer Vision and Pattern Recognition, Jun. 18, 2022, pp. 9676-9686.

Lee, et al., "Background Suppression Network for Weakly-Supervised Temporal Action Localization", In Proceedings of the AAAI Conference on Artificial Intelligence, vol. 34, Issue 7, Apr. 3, 2020, pp. 11320-11327.

Lee, et al., "Weakly-supervised Temporal Action Localization by Uncertainty Modeling", In Proceedings of the AAAI Conference on Artificial Intelligence, vol. 35, Issue 3, May 18, 2021, pp. 1854-1862.

Li, et al., "DivideMix: Learning with Noisy Labels as Semi-supervised Learning", In Proceedings of the International Conference on Learning Representations, Dec. 20, 2019, 14 Pages.

Lin, et al., "BMN: Boundary-Matching Network for Temporal Action Proposal Generation", In Proceedings of the IEEE/CVF international conference on computer vision, Oct. 27, 2019, pp. 3889-3898.

Lin, et al., "BSN: Boundary Sensitive Network for Temporal Action Proposal Generation", In Proceedings of the European conference on computer vision, Sep. 8, 2018, 17 Pages.

Lin, et al., "Fast Learning of Temporal Action Proposal via Dense Boundary Generator", In Proceedings of the AAAI Conference on Artificial Intelligence, vol. 34, Issue 7, Apr. 3, 2020, pp. 11499-11506.

Lin, et al., "Focal loss for dense object detection", In Proceedings of the IEEE international conference on computer vision, Oct. 22, 2017, pp. 2980-2988.

Lin, et al., "Learning Salient Boundary Feature for Anchor-free Temporal Action Localization", In Proceedings of the IEEE/CVF Conference on Computer Vision and Pattern Recognition, Jun. 20, 2021, pp. 3319-3329.

Liu, et al., "The Blessings of Unlabeled Background in Untrimmed Videos", In Proceedings of the IEEE/CVF Conference on Computer Vision and Pattern Recognition, Jun. 19, 2021, pp. 6176-6185.

Liu, et al., "Weakly Supervised Temporal Action Localization Through Contrast Based Evaluation Networks", In Proceedings of the IEEE/CVF International Conference on Computer Vision, Oct. 27, 2019, pp. 3899-3908.

Long, et al., "Gaussian Temporal Awareness Networks for Action Localization", In Proceedings of the IEEE/CVF Conference on Computer Vision and Pattern Recognition, Jun. 19, 2022, pp. 344-353.

Luo, et al., "Action Unit Memory Network for Weakly Supervised Temporal Action Localization", In Proceedings of the IEEE/CVF Conference on Computer Vision and Pattern Recognition, Jun. 19, 2021, pp. 9969-9979.

Luo, et al., "Weakly-Supervised Action Localization with Expectation-Maximization Multi-Instance Learning", In Proceedings of the European Conference on Computer Vision, Oct. 7, 2020, pp. 729-745.

Ma, et al., "Weakly Supervised Action Selection Learning in Video", In Proceedings of the IEEE/CVF Conference on Computer Vision and Pattern Recognition, Jun. 19, 2021, pp. 7587-7596.

Min, et al., "Adversarial Background-Aware Loss for Weakly-Supervised Temporal Activity Localization", In Proceedings of the European Conference on Computer Vision, Nov. 13, 2020, pp. 283-299.

Moniruzzaman, et al., "Action Completeness Modeling with Background Aware Networks for Weakly-Supervised Temporal Action Localization", In Proceedings of the 28th ACM International Conference on Multimedia, Oct. 12, 2020, pp. 2166-2174.

Narayan, et al., "D2-Net: Weakly-Supervised Action Localization via Discriminative Embeddings and Denoised Activations", In Proceedings of the IEEE/CVF International Conference on Computer Vision, Oct. 10, 2021, pp. 13588-13597.

Nguyen, et al., "Weakly-Supervised Action Localization With Background Modeling", In Proceedings of the IEEE/CVF International Conference on Computer Vision, Oct. 27, 2019, pp. 5501-5510.

Pardo, et al., "BAOD: Budget-Aware Object Detection", In Proceedings of the IEEE/CVF Conference on Computer Vision and Pattern Recognition Workshops, Jun. 19, 2021, pp. 1247-1256.

Pardo, et al., "RefineLoc: Iterative Refinement for Weakly-Supervised Action Localization", In Proceedings of the IEEE Winter Conference on Applications of Computer Vision, Jan. 3, 2021, pp. 3318-3327.

Paul, et al., "W-TALC: Weakly-supervised Temporal Activity Localization and Classification", In Proceedings of the European Conference on Computer Vision, Sep. 8, 2018, 17 Pages.

(56) References Cited

OTHER PUBLICATIONS

Qu, et al., "ACM-Net: Action Context Modeling Network for Weakly-Supervised Temporal Action Localization", In Repository of arXiv:2104.02967v1, Apr. 7, 2021, 11 Pages.

Ren, et al., "Learning to Reweight Examples for Robust Deep Learning", In Proceedings of the International Conference on Machine Learning, Jul. 3, 2018, 10 Pages.

Shi, et al., "Weakly-Supervised Action Localization by Generative Attention Modeling", In Proceedings of the IEEE/CVF Conference on Computer Vision and Pattern Recognition, Jun. 13, 2020, pp. 1009-1019.

Shou, et al., "Temporal Action Localization in Untrimmed Videos via Multi-stage CNNs", In Proceedings of the IEEE conference on computer vision and pattern recognition, Jun. 26, 2016, pp. 1049-1058.

Singh, et al., "Hide-and-Seek: Forcing a Network to be Meticulous for Weakly-Supervised Object and Action Localization", In Proceedings of the IEEE International Conference on Computer Vision, Oct. 22, 2017, pp. 3544-3553.

Vu, et al., "Predicting Actions from Static Scenes", In Proceedings of the European Conference on Computer Vision, Sep. 6, 2014, pp. 421-436.

Xu, et al., "R-C3D: Region Convolutional 3D Network for Temporal Activity Detection", In Proceedings of the IEEE International conference on computer vision, Oct. 22, 2017, pp. 5783-5792.

Xu, et al., "Segregated Temporal Assembly Recurrent Networks for Weakly Supervised Multiple Action Detection", In Proceedings of the AAAI Conference on Artificial Intelligence, vol. 33, Issue 1, Jul. 17, 2019, pp. 9070-9078.

Yang, et al., "ACGNet: Action Complement Graph Network for Weakly-Supervised Temporal Action Localization", In Proceedings of the AAAI Conference on Artificial Intelligence, vol. 36, Issue 3, Jun. 28, 2022, pp. 3090-3098.

Yang, et al., "Uncertainty Guided Collaborative Training for Weakly Supervised Temporal Action Detection", In Proceedings of the IEEE/CVF Conference on Computer Vision and Pattern Recognition, Jun. 20, 2021, pp. 53-63.

Zhai, et al., "Two-Stream Consensus Network for Weakly-Supervised Temporal Action Localization: Supplementary Material", In Proceedings of the European Conference on Computer Vision, Nov. 2020, 18 Pages.

Zhang, et al., "ActionFormer: Localizing Moments of Actions with Transformers", In Proceedings of the European Conference on Computer, Oct. 23, 2022, 19 Pages.

Baraka, et al., "Weakly-supervised temporal action localization: a survey", Neural Computing and Applications, vol. 34, Issue 11, Mar. 7, 2022, pp. 8479-8499.

International Search Report and Written Opinion received for PCT Application No. PCT/US2024/026929, Jul. 24, 2024, 12 pages.

Ju, et al., "Adaptive Mutual Supervision for Weakly-Supervised Temporal Action Localization", IEEE Transactions on Multimedia, vol. 25, Oct. 16, 2022, pp. 6688-6701.

Rizve, et al., "PIVOTAL: Prior-Driven Supervision for Weakly-Supervised Temporal Action Localization", In Proceedings of 2023 IEEE/CVF Conference on Computer Vision and Pattern Recognition (CVPR), May 20, 2023, 11 Pages.

Rizve, Nayeem, "Wayback Machine—Open Access CVPR2023—PivoTAL: Prior-Driven Supervision for Weakly-Supervised Temporal Action Localization", Retrieved from the URL: https://web.archive.org/web/20231001000000*/https://openaccess.thecvf.com/content/CVPR203/papers/Rizve_PivoTAL_Prior-Driven._Supervision_for_Weakly-Supervised_Temporal_Action_Localization_CVPR_2023_paper.pdf, May 20, 2023, 1 Page.

Yu, et al., "Context Driven Network with Bayes for Weakly Supervised Temporal Action Localization", In Proceedings of 2021 IEEE International Conference on Multimedia and Expo (ICME), Jul. 5, 2021, pp. 1-6.

Zhang, et al., "Adversarial Complementary Learning for Weakly Supervised Object Localization", In Proceedings of the IEEE/CVF Conference on Computer Vision and Pattern Recognition, Jun. 18, 2018, pp. 1325-1334.

Zhang, et al., "Adversarial Seeded Sequence Growing for Weakly-Supervised Temporal Action Localization", In Proceedings of the 27th ACM International Conference on Multimedia, Oct. 21, 2019, pp. 738-746.

Zhang, et al., "CoLA: Weakly-Supervised Temporal Action Localization with Snippet Contrastive Learning", In Proceedings of the IEEE/CVF Conference on Computer Vision and Pattern Recognition, Jun. 20, 2021, pp. 16005-16013.

Zhao, et al., "Recognize Actions by Disentangling Components of Dynamics", In Proceedings of the IEEE/CVF Conference on Computer Vision and Pattern Recognition, Jun. 18, 2018, pp. 6566-6575.

Zhao, et al., "Temporal Action Detection With Structured Segment Networks", In Proceedings of the IEEE International Conference on Computer Vision, Oct. 22, 2017, pp. 2933-2942.

Zheng, et al., "Distance-IoU Loss: Faster and Better Learning for Bounding Box Regression", In Proceedings of the AAAI Conference on Artificial Intelligence, vol. 34, Issue 7, Apr. 3, 2020, pp. 12993-13000.

Zhong, et al., "Step-by-step Erasion, One-by-one Collection: A Weakly Supervised Temporal Action Detector", In Proceedings of the 26th ACM international conference on Multimedia, Oct. 15, 2018, pp. 35-44.

International Preliminary Report On Patentability received for PCT Application No. PCT/US2024/026929, mailed on Dec. 11, 2025, 07 pages.

* cited by examiner

Actionness Score Computation

500

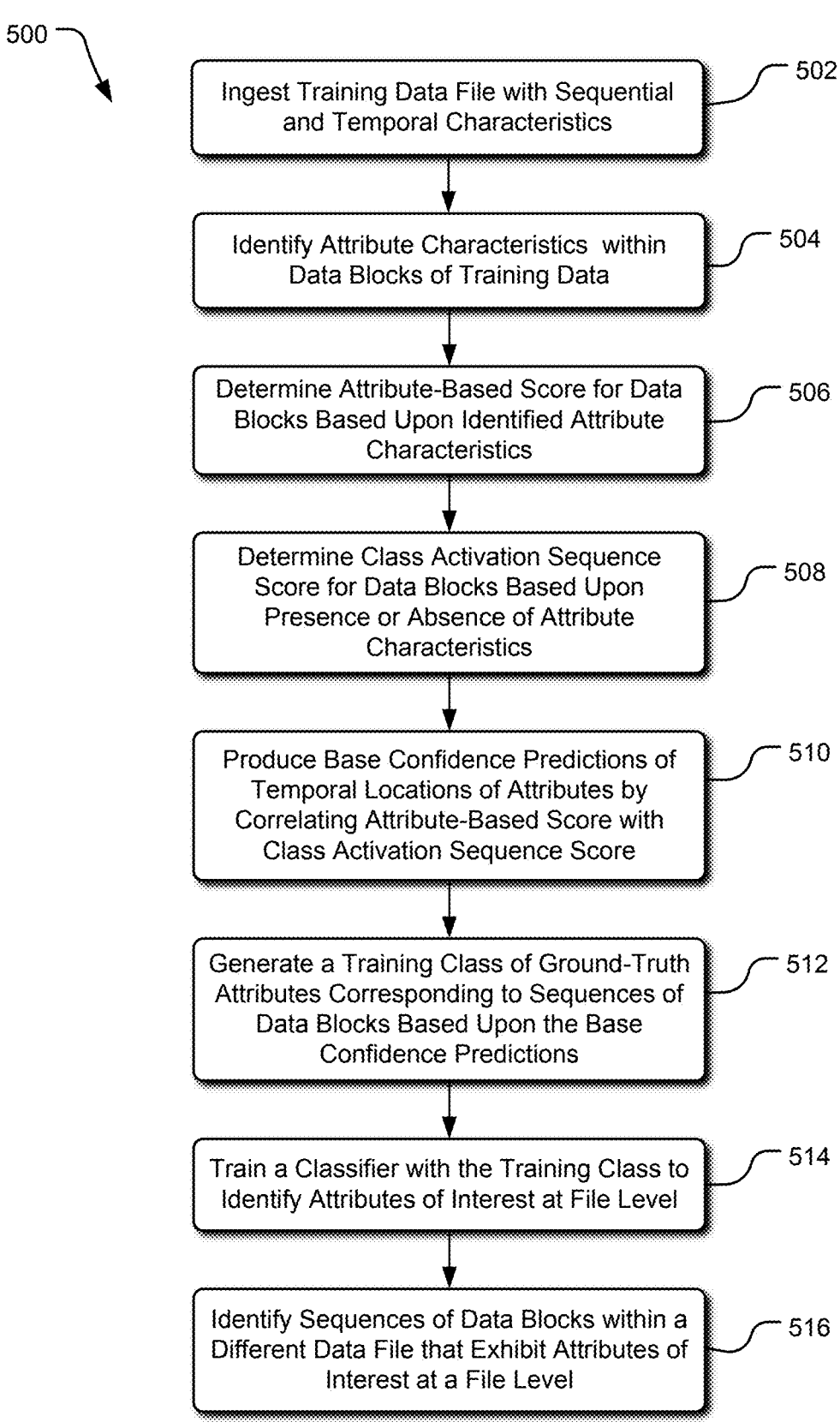

502

Ingest Training Data File with Sequential and Temporal Characteristics

504

Identify Attribute Characteristics within Data Blocks of Training Data

506

Determine Attribute-Based Score for Data Blocks Based Upon Identified Attribute Characteristics

508

Determine Class Activation Sequence Score for Data Blocks Based Upon Presence or Absence of Attribute Characteristics

510

Produce Base Confidence Predictions of Temporal Locations of Attributes by Correlating Attribute-Based Score with Class Activation Sequence Score

512

Generate a Training Class of Ground-Truth Attributes Corresponding to Sequences of Data Blocks Based Upon the Base Confidence Predictions

514

Train a Classifier with the Training Class to Identify Attributes of Interest at File Level

516

Identify Sequences of Data Blocks within a Different Data File that Exhibit Attributes of Interest at a File Level

FIG. 5

PRIOR-DRIVEN SUPERVISION FOR WEAKLY-SUPERVISED TEMPORAL ACTION LOCALIZATION

BACKGROUND

Temporal action localization (TAL) refers to the task of predicting where and what category of action happens in an arbitrarily long, untrimmed video clip. While TAL is used in a wide variety of localization applications ranging from sports to robotics to safety, it is challenging to implement as it requires development of a model with a strong temporal and spatial understanding of the video scene and events for effective localization. Furthermore, fully-supervised TAL relies on the availability of processing intensive, dense annotations to determine and identify the start and end of each action segment in the training videos.

Weakly-supervised Temporal Action Localization (WTAL) serves to mitigate this dependency on dense annotations by operating only on video-level annotations, i.e., by recognizing which actions occur in the training video without knowing their precise locations within the training video, while still being able to predict the start and end of an action segment in test videos. Several methods have attempted to perform WTAL by employing different techniques which include Multiple Instance Learning (MIL) and attention mechanisms. These previous works approach WTAL from a frame-by-frame based, "localization-by-classification" perspective, wherein the underlying method attempts to classify each video frame into zero or more action categories followed by a manually designed, post-processing pipeline to aggregate these per-frame action predictions into action segments with explicit boundaries.

SUMMARY

This disclosure presents an improved implementation over typical WTAL processing for temporal action localization. The disclosed algorithmic implementation utilizes prior-driven supervision for WTAL to approach TAL from a "localization-by-localization" perspective, i.e., by learning to localize the action segments, or "snippets," directly as an entire sequence rather than on a frame-by-frame classification basis. To this end, the disclosed prior-driven algorithm exploits the inherent spatio-temporal structure of the video data in the form of action-specific scene prior, action snippet generation prior, and learnable Gaussian prior to derive "pseudo-action snippets." These pseudo-action snippets act as an additional source of supervision in the prior-driven algorithm to complement the under-constrained video-level, weak-supervision (i.e., WTAL) to perform the localization task.

In one example implementation, a method for training a classifier model for temporal action localization of video clips is disclosed. A training video clip that includes actions of interest for identification is ingested into an initial classifier. Action characteristics within frames of the video clip are identified. The actions correspond to known action classes. An actionness score is determined for each of the frames based upon the action characteristics identified within each of the frames. Class activation sequence (CAS) scores are determined for sequences of the frames based upon a presence or an absence of the action characteristics identified within each of the frames. Base confidence predictions of temporal locations of actions of interest within the video clip are produced by correlating each of the actionness scores with corresponding class activation scores for each of the frames in the sequences of frames. A training class of action snippets corresponding to known ground-truth actions within the video clip is generated based on the base confidence predictions. A prior-driven classifier is trained with the training class to identify the actions of interest at a video level. Video segments are identified within a different video clip that exhibit the actions of interest by processing the different video clip at a video level with the prior-driven classifier.

In another example implementation, a system for training a classifier model for temporal action localization of video clips is disclosed. The system includes a computing processor; a memory; a weakly-supervised temporal action localization (WTAL) model stored in the memory and executable by the processor; a snippet generator stored in the memory and executable by the processor; and a prior-driven, weakly-supervised temporal action localization model stored in the memory and executable by the processor. The WTAL model is configured to ingest into a first classifier within the WTAL model a video clip that includes actions of interest for identification. The WTAL model is further configured to identify action characteristics within frames of the video clip, the action characteristics corresponding to known action classes. The WTAL model is further configured to determine an actionness score for each of the frames based upon the action characteristics identified within each of the frames. The WTAL model is further configured to determine a class activation sequence score (CAS) for sequences of the frames based upon a presence or an absence of the action characteristics identified within each of the frames. The WTAL model is further configured to produce one or more base confidence predictions of temporal locations of actions of interest within the video clip by correlating each of the actionness scores with corresponding class activation scores for each of the frames in the sequences frames. The snippet generator is configured to generate a training class of action snippets corresponding to known ground-truth actions within the video clip based on the one or more base confidence predictions of temporal locations of actions of interest. The prior-driven, weakly-supervised temporal action localization model is configured to train a prior-driven classifier with the training class to identify the actions of interest at a video level and identify video segments within a different video clip that exhibit the actions of interest by processing the different video clip at a video level with the prior-driven classifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 illustrates a flow diagram of an example method for training a temporal action localization classifier for identification of action segments of interest in a sequential and temporal data file.

DETAILED DESCRIPTION

Figure 1:
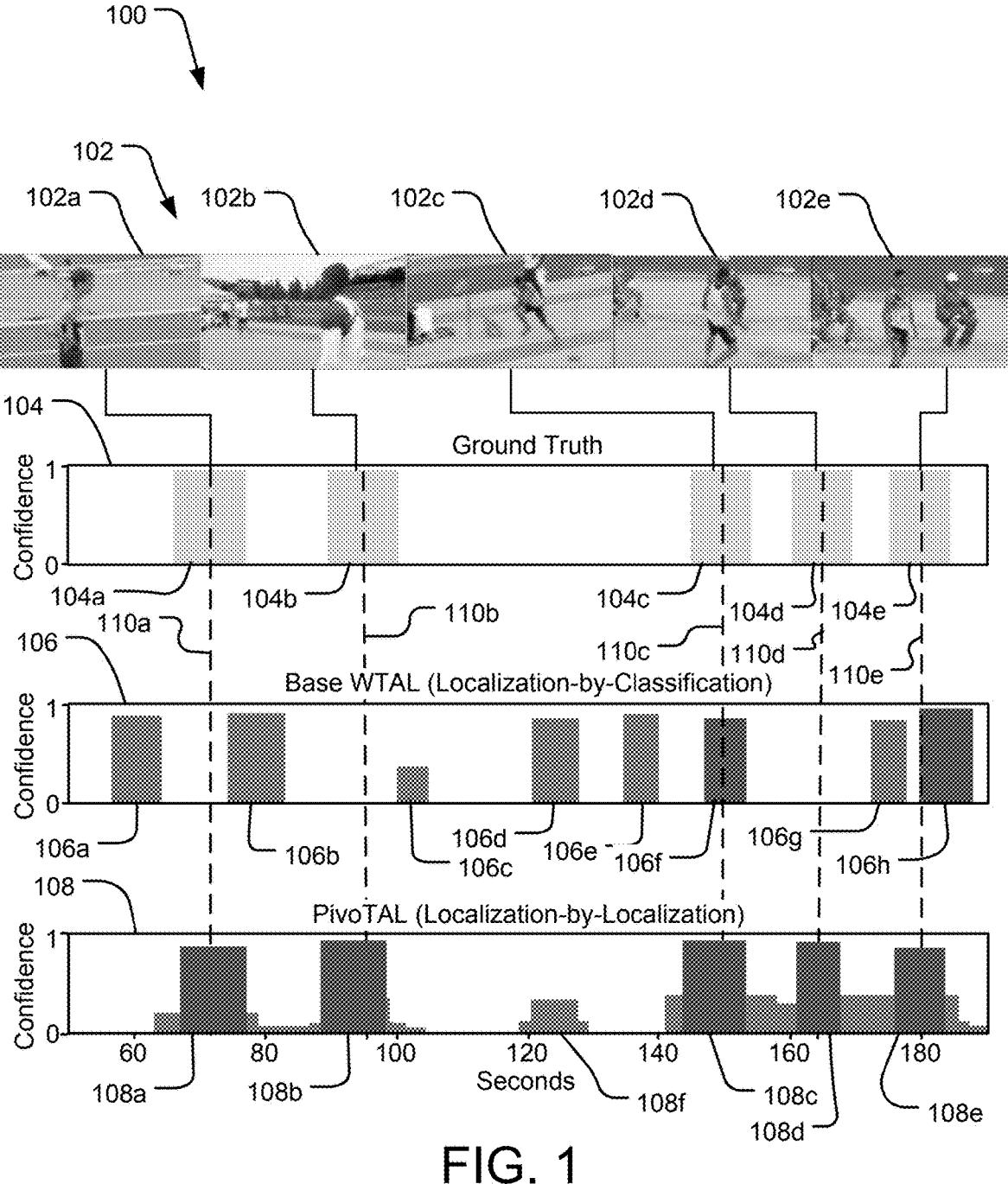
FIG. 1 illustrates an example of comparative efficacy of different temporal action localization methods for identification video segments corresponding to instances of a type of action within a video clip.

The present disclosure is directed to machine-based learning techniques for training classifiers to identify attributes in data that has sequential and temporal properties. A specific example of such data is a video clip. In some example implementations, a video clip may include scenes of a particular type of action of interest. For example, in a video clip of a baseball game, scenes of interest may include sequences of action such as pitches, batters swinging, defensive plays, etc. Each of these action scenes generally starts at a first video frame with a first time stamp and ends at a sequentially later video frame with a second time stamp. As most anyone familiar with baseball is aware, between these sequences of frames that define action scenes, the remaining video frames depict lengthy sequences of inactivity, or activity of minimal visual interest. Therefore, it is often desirable and advantageous to identify the sequences of interesting activity in video clips for facility and quick access, for example, to aid in television production, e.g., of highlight reels, by identifying action sequences by type (i.e., pitching or hitting) and by timestamp. Minimizing the amount of data needed to identify such sequences is a significant factor in reducing processing speed and processor requirements generally.

Video classifiers may be trained to identify various aspects of video clips, including specific types of action scenes, using machine learning models. The classifiers are trained by using models that operate on training data, e.g., video files with known attributes previously manually identified. For example, a training video for baseball would include many scenes of action classified as particular attributes (e.g., pitching, hitting, etc.). The beginning and ending time stamps of these scenes are also known. Machine learning models are constructed to attempt to identify the scenes with attributes of interest within the training video clips without prior knowledge of the locations of such scenes. The efficacy of a classifier after training by a model can be determined by comparing how well the classifier identifies both attributes and start and stop times for action sequences within a ground-truth video clip, i.e., a sample video with known attributes and their locations. The closer output of the classifier is to the ground truth data of a sample video clip, the better the classifier is likely to perform when analyzing new, unknown video clips. The goal of the training of the classifier through machine learning is to determine a level of confidence in the trained classifier that it will adequately, if not exceptionally, identify the attributes of interest in unknown data files.

Various forms of temporal action localization (TAL) are commonly used in machine learning models to train classifiers to analyze video clips and identify sequences or segments thereof that correspond to actions of interest. Fully-supervised methods for TAL can be broadly divided into two categories: anchor-based methods and anchor-free methods. The anchor-based methods learn the boundaries of segments of specific types of actions by performing regressions based on a pre-defined set of "action proposals," i.e., samples of the actions with typical movement and start and ending sequences. As these methods rely on pre-defined anchors, they tend to perform poorly on actions which are extremely short or very long. The anchor-free methods mitigate this performance problem of anchor-based methods by explicitly predicting the action offset and probability for each clip. A difference between these methods and The prior-driven algorithm is that these methods require expensive (processor intensive and large data set), per-clip annotations while The prior-driven algorithm uses video-level labels.

Weakly-supervised Temporal Action Localization (WTAL) methods can be broadly classified into two categories: single-stage methods and multi-stage methods. The single-stage WTAL methods can be further divided into three main categories: Multiple Instance Learning (MIL)-based, attention-based, and erasing-based methods. The MIL-based methods are the simplest of these single-stage methods which treat a video clip as a container holding positive samples (i.e., segments corresponding to foreground actions) and negative samples (i.e., segments corresponding to background scene(s)). For training, MIL-based methods perform top-k positive sample selection (i.e., sorting by probability and zeroing out the probabilities for anything below the k'th token) and aggregate these samples as predictions to train with one or more video-level labels. Video-level labels are descriptors of one or more types of actions identified in a video clip, or shorter segments thereof, based upon the known actions in the training video dataset, rather than descriptions at an individual frame level. For example, a video of "hiking" as the primary action may have individual frames labeled as containing trees. The video-level label for the entire video, or segments of the video showing hikers, would be "hiking," which would be the foreground action, while individual frames might only show trees (the background scene), which might also appear behind or in conjunction with the action of hiking.

Attention-based methods try to avoid top-k based hard selection and perform class-agnostic foreground actionness-based, attentional pooling to aggregate the clip-level scores to obtain video-level predictions for training. "Actionness" is a term of art in the context of temporal action localization which is intended to refer to a confidence measure of intentional bodily movement, typically of biological agents, e.g., humans and animals, performing actions or moving within the video frames. Actionness scoring separates frames with action of interest by such actors from frames with only background, even if background is moving or has natural action. Most prior work addresses actionness with supervised methods based on manual annotation of a known and limited set of action classes. This is done by training a binary classifier for estimating an "actionness score" for spatial action detection. The higher the score, the more likely the action is present in a sequence of frames (i.e., a segment or snippet) within a video clip with similar high scores.

The erasing-based methods take an adversarial, complementary learning approach to address the tendency of WTAL methods to focus on the most discriminative parts of the video clip. To this end, these methods try to increase the weight of less discriminative parts of the video clip.

The multi-stage training-based methods generally take a self-training approach. The primary objective of these methods is to generate per-clip pseudo-labels from an initial WTAL model and then perform further training with those generated pseudo-labels. Technically such pseudo-label-based self-training can be repeated for multiple iterations. However, these multi-stage methods still rely only on the training data sets and do not utilize the action snippets explicitly and, therefore, do not have an explicit notion of action boundaries. Therefore, this per-clip, pseudo-label-based self-training still performs temporal action localization by classification of frames to find boundaries.

The example prior-driven algorithm disclosed herein is complementary to all of these approaches as it incorporates existing action "priors" into training to perform localization-by-localization. A "prior" is a term of art in statistics referencing a "prior probability distribution" of an uncertain quantity, which is an assumed probability distribution of the uncertain quantity before some evidence is taken into account. The unknown quantity may be a parameter of the model or a latent variable rather than an observable variable. For example, a prior in the present TAL context may be a probability distribution representing the likelihood of instances of an action of interest within a video clip based upon prior WTAL processing. As noted, The prior-driven algorithm approaches WTAL from localization-by-localization perspective by learning to localize the action snippets directly. The prior-driven algorithm exploits inherent spatio-temporal structures of the video data in the form of action-specific scene prior, action snippet generation prior, and learnable Gaussian prior to supervise the localization-based training and derive pseudo-action snippets. These pseudo-action snippets act as an additional source of supervision in the prior-driven algorithm to complement the under-constrained, video-level, weak-supervision to perform the localization task.

A schematic comparison 100 between typical WTAL and the prior-driven algorithm performance is depicted in FIG. 1. Action segments or snippets 102*a-e* from a video clip 102 are depicted at the top of the schematic comparison 100. In this example, the video clip 102 is from a long jump competition and the snippets 102*a-e* represent segments within the video in which an athlete is actually running and jumping as opposed to segments in which there is no significant activity of interest. The "ground truth" timeline 104 is a representation in the form of a temporal bar graph depicting the snippets 102*a-e* as corresponding, respective temporal segments 140*a-e* within the entire timeline of the video clip 102, which is about 200 seconds long. As the temporal segments 104*a-e* represent the actual, known, or true location of the action within the video clip 102, the confidence score for each of the temporal segments 104*a-e* is high, i.e., 1 on a normalized scale of 0-1.

A second timeline 106 corresponding to a typical WTAL analysis (referred to as "Base WTAL") of the video clip 102 is also depicted in FIG. 1. The second timeline 106 shows the final action snippet predictions 106*a-h* of long jump action within the video clip 102 from the Base WTAL localization-by-classification method. As is clear through comparison of the locations of the snippet predictions 106*a-h* in the second timeline 106 to the truth snippets 102*a-e* in the ground truth timeline 104, Base WTAL is challenged and the predictions are inaccurate. First, the localization-by-classification training is performed only with the coarse video-level labels, which encourages the model to focus on the most discriminative parts of the video, resulting in incomplete and fragmented action snippets, e.g., as exemplified in the range of 140-160 s for Base WTAL on the second timeline 106 of FIG. 1). A higher rate of false positives is also apparent due to the misclassification of background that closely resembles foreground, for example, at ~60*s* for Base WTAL in the second timeline 106. Second, since the model is trained to perform per-frame predictions, it lacks any explicit notion of action boundaries, thus resulting in a discrepancy between the classification-based training and localization-based test objectives. This is generally addressed by incorporating carefully designed, post-processing algorithms. Even though such post-hoc transformations can encode crucial prior knowledge of temporal structure of videos, they cannot influence the model training for improving the localization performance directly.

A third timeline 108 is presented in FIG. 1 representing the improvement of the prior-driven algorithm processing of the video file over standard WTAL processing represented in the second timeline 106. As is evident, the most confident snippet predictions 108*a-e* are generally well-aligned with the ground truth snippets 102*a-e* from the ground truth timeline 104 and are of a correspondingly similar duration. The low confidence score of the one outlying snippet prediction 108*f* suggests that it be discarded from the ultimate TAL set produced. The prior-driven algorithm method employs an action-specific scene prior in the background MIL loss to inject action-specific bias into the background frames to improve action boundaries. The results of this improvement are represented at the snippet prediction 108*e* at about 180*s* into the third timeline 108 in FIG. 1 as compared to the Base WTAL result in the second timeline 106 at the same time stamp with poor prediction snippets 106*g*, 106*h* of desired action with high confidence, when in fact these predictions are on each side of the ground truth snippet 104*e* and do not cover the center of ground truth action.

The prior-driven algorithm method also complements the per-frame actionness scores learned by the model with learnable Gaussian prior-based actionness scores to incorporate context from nearby frames and to improve the smoothness of predicted action snippets, e.g., as indicated at 140*s*-160*s* in the third timeline 108 in FIG. 1. As depicted, compared to the narrower time band of snippet prediction 106*f* in the second timeline 106, the snippet prediction 108*c* in the third timeline is closer in duration to the ground truth snippet 104*c* and the lower confidence scores of leading and trailing frames are used to boost the width of the predicted snippet 108*c*. Experiments on the standard WTAL datasets, e.g., THUMOS' 14 and ActivityNet-v1.3, achieved 3.2% and 3.0% absolute improvement in the average precision over all activity categories ("mAP"), respectively, over all previous methods. This demonstrates an advantage of the prior-driven algorithm methodology in effectively utilizing the priors, leading to a significant improvement in the localization performance.

Figure 2:
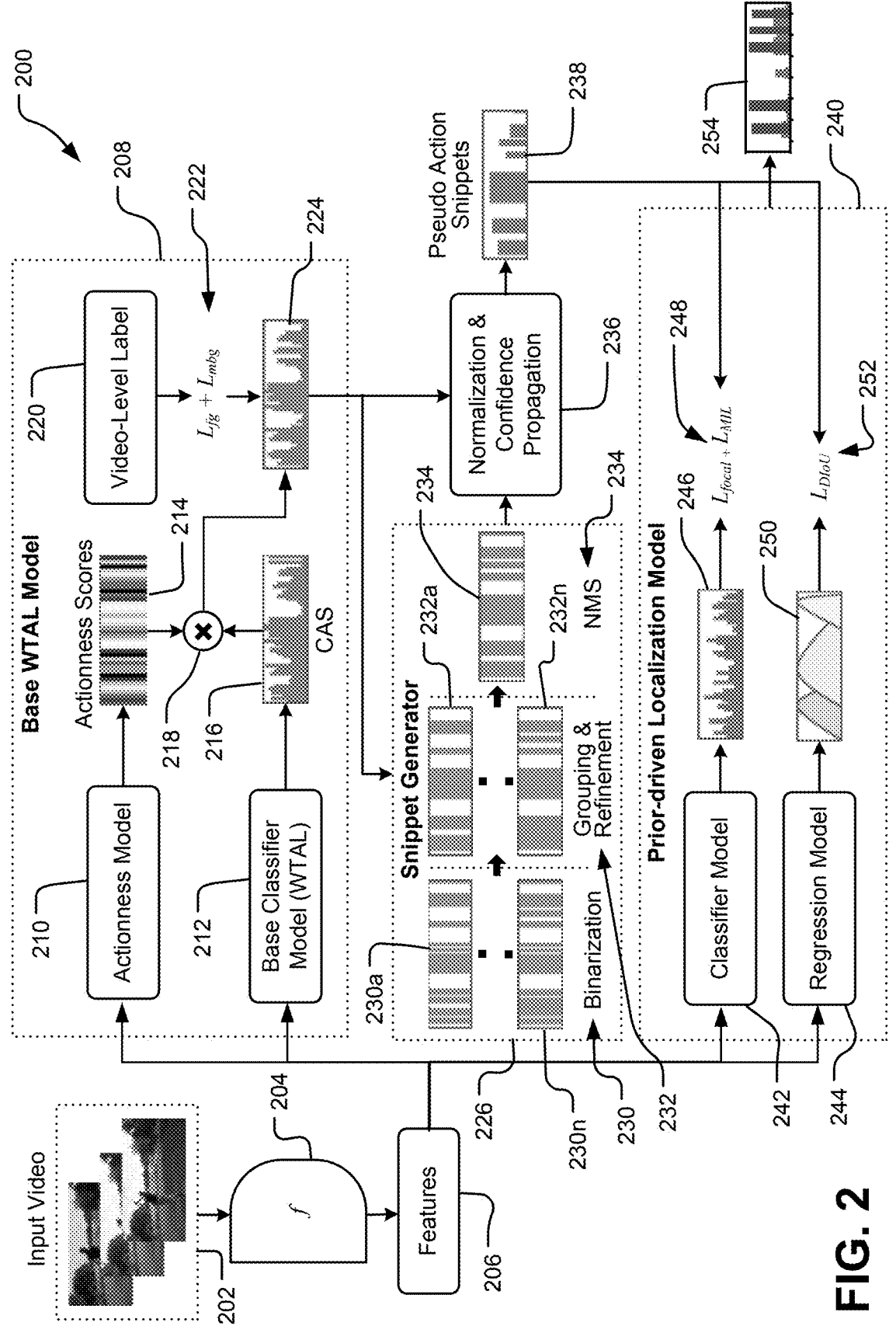
FIG. 2 illustrates an example of elements of a training method for a machine learning model of a temporal action localization classifier for determining specific video segments corresponding to instances of a type of action within a video clip.

An overview of an example a method 200 for implementation of the prior-driven algorithm for a video file 202 is depicted schematically in FIG. 2. Initially, the input video file 202 is processed through a feature extractor 204, which outputs a features dataset 206 of common action characteristics, i.e., visual features indicative of particular predefined types of action found within multiple frames throughout the video file 202. The features dataset 206 is used as input for training a base WTAL model 208 to perform weakly-supervised temporal action localization using video-level supervision. An example of the base WTAL model 208, which may be used in one or more embodiments of the prior-driven algorithm, incorporates two subprocess learning models which each ingest the features dataset 206 and output per-frame scores and video-level scores, respectively, for use in further configuration of inputs to a second, prior-driven model. A class-agnostic actionness model 210, which is described in greater detail herein with respect to FIG. 3, outputs an actionness score 214 for each frame, and a base classifier model 212 outputs class activation sequence (CAS) scores 216, i.e., video-level classification values as representative of one or more action classes and background classes over temporally-related sequences of frames. In some implementations, the CAS scores 216 are further enhanced using the actionness scores 214 via a Hadamard product 218 between the two, and by application of foreground ($L_{fg}$) and foreground-weighted background ($L_{bg}$) MIL losses 222 as outputs of a video-level weak labeling process 220, as further described herein with respect to FIG. 4. The Base WTAL model 208 ultimately renders a set of modified CAS scores 224 with confidence predictions for desired action segments in the video file 202.

Next, the method 200 creates pseudo-action snippets 238 by employing snippet generator 226 to compute an action snippet generation prior. The snippet generator 226 first applies a binarization algorithm 230 to each of the confidence predictions 230*a-n* in the set of confidence predictions 224 from the base WTAL model 208. Next, the snippet generator 226 applies a grouping and refinement algorithm 232 to each of the binarized confidence predictions 232*a-n* output by the binarization algorithm 230.

In some implementations, the snippet generator 226 further applies a non-maximum suppression algorithm (NMS) 234 to the set of refined confidence predictions 234 after refinement by the grouping and refinement algorithm 232 to obtain hard action snippets. The method 200 then normalizes the hard action snippets with the original confidence predictions 224 of the Base WTAL model 208 using a normalization and confidence propagation algorithm 236 to create the pseudo-action snippets 238 that are "confidence-aware," i.e., have a confidence score ascribed to each of the pseudo-action snippets 238.

Finally, a prior-driven localization model 240 is trained using the pseudo-action snippets 238 as ground-truth to predict and localize action snippets 252 directly, i.e., identify start and end points for actions at a video level rather than at a frame level, with high confidence. An example of the prior-driven localization model 240, which may be used in one or more embodiments of the prior-driven algorithm, includes a classification model 242 and a regression model 244, which both rely upon labeled input of the feature dataset 206 and the training data, i.e., the pseudo action snippets 238 output by the base WTAL model 208. To train the prior-driven localization model 240, action loss terms 248 are used in the classification model 242 and temporal offset loss terms 252 are used in the regression model 244. For example, a focal loss, $\mathcal{L}_{focal}$, for per-clip action classification may be used, in addition to the MIL-based classification loss, $\mathcal{L}_{MIL}$, as action loss terms 248 when training the classification model 242. Also, as an example, a distance intersection over union (DIoU) based regression loss, $\mathcal{L}_{DIoU}$, may be used as temporal offset loss terms 252 to determine the action boundaries in an anchor-free manner when training the regression model 244. The use of such loss terms for model training are described later herein in greater detail.

Once trained, the classification model 242 categorizes actions of interest within the feature dataset 206 based upon training with the pseudo action snippets 238 and outputs a set of predicted localized action snippets 246. The trained regression model 244 operates on the feature dataset 206 in parallel to enhance output of the classification model 242 by forecasting or predicting trends and outcomes using algorithms that test relationships between different independent variables and a dependent variable or outcome within the data. The regression model 244 may be used to predict likely trends or outcomes from latent input data or can understand gaps in some data sets based upon historic data. The regression model 244 thus outputs probability data 250 related to actions within the feature dataset 206 for use in refinement of the predicted localized action snippets 246.

In a WTAL environment, access to a set of weakly labeled videos $\mathbb{V} = \{v^{(i)}, y^{(i)}\}_{i=1}^{N}$ is typically provided, where N represents the total number of samples, $v^{(i)}$ represents an untrimmed input video, and $y^{(i)}$ represents the set of action classes present in video $v^{(i)}$ with no information about the precise locations of the action classes in the video. More specifically, $y^{(i)}$ can be represented with a multi-label, one-shot encoding such that $y^{(i)} \in \{0,1\}^{C+1}$ where C is the total number of action classes present in the dataset. In one implementation, an additional class is added to model the background. During inference, the objective is to predict a set of action snippets $\mathbb{A}^{(i)} = \{c_j, s_j, e_j\}_{j=1}^{M}$ for video $v^{(i)}$, where M is the total number of action snippets, $c_j$ is the predicted class, $s_j$ is the start time, and $e_j$ is the end time of a particular action snippet j. Note, $v^{(i)}$ and $y^{(i)}$ are referenced merely as v and y, respectively, in the subsequent text for simplicity.

As shown in FIG. 2, the method 200 comprises a base WTAL model 208 to perform MIL-based WTAL using video-level supervision. If an unmanageably long, untrimmed video file 202 is provided for the WTAL task, it can be computationally prohibitive to encode the entire video file 202 in a single forward pass through a feature encoder. Typically, a video greater than ten (10) seconds is considered to be an unmanageable, untrimmed video. Without restriction to any particular duration, an untrimmed video is an arbitrarily long video comprising some frames depicting an activity of interest (i.e., actioneness) along with frames where no activity of interest is happening (i.e., background frames). For example, a video of five (5) seconds can also be considered untrimmed if the action frames span a duration of one (1) second and the remaining four (4) seconds contain only background frames. Therefore, a given video may be split into multiple small segments or video clips g, i.e., $v = \{g_k\}_{k=1}^{T}$, where T is the total number of video clips present in the entire video file 202.

As shown in FIG. 2, the video clips may then be processed using a feature extractor 204, f, where f is a neural network, to obtain the recognized features $z_g$ found within the set of video clips $g_k$, such that $f:g \mapsto z_g$, where $z_g \in \mathbb{R}^d$. g is given as input to f and f returns $z_g$ as output. $\mathbb{R}$ denotes a range of real numbers and $\mathbb{R}^d$ represents a d-dimensional space of the real-numbers $\mathbb{R}$. $z_g$ is the feature representation obtained as output corresponding to video clip g from the feature extractor, f. The dimension of $z_g$ is d, meaning it is a vector of d values and each value can be a real number such that $z_g$ is an element of $\mathbb{R}^d$. The video-level feature dataset 206, $z_v$, may be obtained by concatenating all the clip level action characteristics such that $z_v \in \mathbb{R}^{T \times d}$, where T is again the number of video clips in the video file. The video-level feature dataset 206, $z_v$, may be processed using the classifier model 212 to project the video-level action characteristics into an output space to obtain class activation sequence (CAS) scores, q, such that $q \in \mathbb{R}^{T \times (C+1)}$, i.e., q is an element of the dimensional space $T \times (C+1)$ of real numbers $\mathbb{R}$, where C is again the total number of action classes present in the dataset and T is again the number of video clips in the video file.

Figure 3:
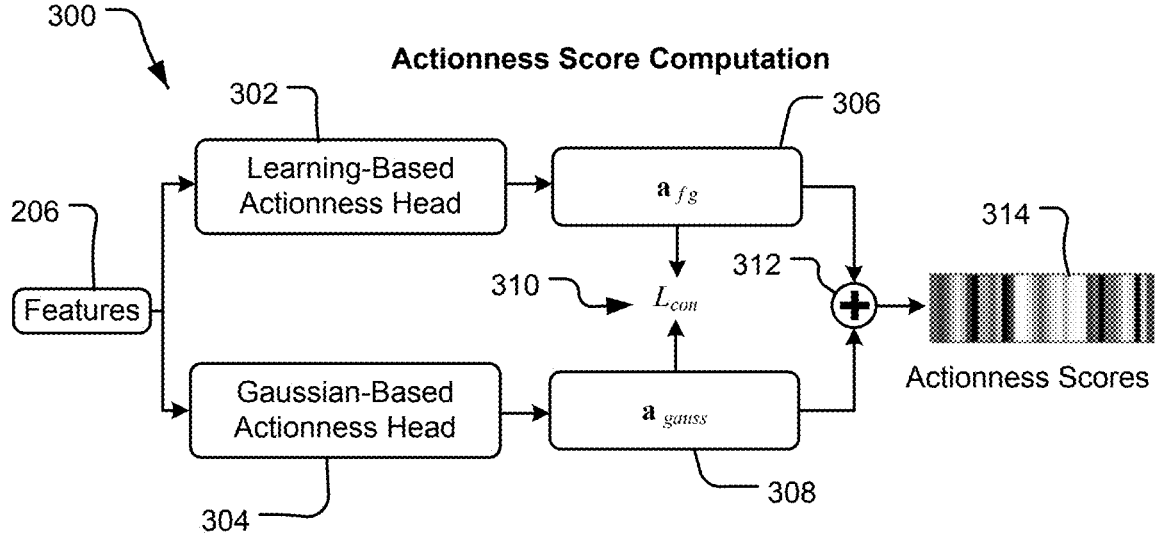
FIG. 3 illustrates example of a first algorithmic subprocess of the training method of FIG. 2.

In parallel, an actionness score generator model 210 using a linear layer may be used to predict class-agnostic actionness scores 214, a, such that $a \in \mathbb{R}^{T \times 2}$, where a 2-dimensional output vector for each clip, without using any context of nearby clips, may be used to model both foreground and background actionness scores as described in greater detail with respect to FIG. 3. One potential way to improve the scores would be to incorporate more local context by utilizing long temporal convolutional kernels or attention mechanisms. One of the primary motivations behind adding local context is that the predictions should be locally consistent. However, effective optimization of such an actionness predictor is non-trivial since the available video-level labels lack any clip-level local information. To provide such a desired local context prior explicitly, the foreground actionness scores may additionally be modeled with learnable Gaussian masks.

As depicted in FIG. 3, for actionness score computation 300, the actionness model 210 may include a learning-based actionness model 302 and a Gaussian prior-based actionness model 304, which both receive the feature dataset 206 as input and process the same to obtain corresponding foreground actionness scores 306 and masked foreground actionness scores 308, respectively. The second, masked foreground actionness scores 308, $a_{gauss}$, may be calculated by introducing a Gaussian mask prediction branch which predicts Gaussian kernels $\{\sigma_i, \mu_i\}_{i=1}^{T}$ for each clip to flexibly model the actionness scores. Clip-specific local Gaussian masks, $G_i$, may be generated from the predicted parameter $\{\sigma_i, \mu_i\}$. To effectively preserve the local context in the final masked foreground actionness scores 308, $a_{gauss}$, local selection from the clip-specific local masks $G_i$ may be performed to generate $a_{gauss}(i)$ by selecting the value at corresponding $i^{th}$ temporal position from the $i^{th}$ Gaussian mask, $G_i$ as, $$G_i = \exp\left(-\frac{\beta(j/T - \mu_i)^2}{\sigma_i^2}\right)_{j=1}^{T}, \tag{1}$$

$$a_{gauss} = \{G_i(i)\}_{i=1}^{T},$$

where, $\beta$ controls the variance of the Gaussian mask, G.

In further explanation, there are T video clips in the video file. Each video clip is fed as input to a feed-forward neural network and the neural network outputs a pair of real numbers. One value of the pair represents the mean, $\mu$, and the other value of the pair represents standard deviation, $\sigma$. This mean and standard deviation for each video clip is used to model a Gaussian mask function G over the T video clips using the mathematical Equation (1). In equation (1), j iterates over the T video clips in each Gaussian mask function. $\beta$ controls the influence of the standard deviation in the Gaussian mask $G_i$. As there are T pairs of mean and standard deviations denoted by $\{\sigma_i, \mu_i\}_{i=1}^{T}$, the result is T Gaussian masks. Using these masks, $a_{gauss}$ is computed, which is a vector representing the Gaussian-mask based actionness scores over all the video clips. The $i^{th}$ value of $a_{gauss}$ is $a_{gauss}(i)$ which is computed by selecting the $i^{th}$ Gaussian function and taking its value at position i. This is represented by second half of Equation (1), i.e., $a_{gauss}=\{G_i(i)\}_{i=1}^{T}$. As noted above, the Gaussian mask explicitly provides a desired local context prior. The Gaussian mask helps incorporate information about the local neighborhood of a given video clip (i.e., adjacent frames) into the actionness score computation. $a_{gauss}$ is combined with learning-based actionness scores by taking an average. This aggregation is the most optimal in representing the actionness score and obtaining the best action localization performance.

Even though generating masked foreground actionness scores 308 based on Gaussian priors can generate locally smooth actionness scores (i.e., the actionness scores across a sequence of frames may be fit to the distribution to determine start and end frames for a sequence with an identified action), it may be observed that integrating the masked foreground actionness scores 308 with the learning-based actionness scores 306 is not straightforward. Performance, i.e., the accuracy of localizing the actions in a video file with respect to the ground truth, actually deteriorates with typical aggregation strategies, likely because of the inconsistency/disagreement between these two actionness scores. To resolve this issue, an actionness consistency loss 310, $\mathcal{L}_{con}$, as defined below in Equation 2 is in one implementation used as a regularizer:

$$\mathcal{L}_{con} = \sum_i (a_{fg}(i) - a_{gauss}(i))^2. \tag{2}$$

As used herein, a regularizer refers to a mechanism that helps to stabilize the training of a neural network model by introducing additional constraints in the behavior of the model. Mere introduction of the Gaussian actionness score and aggregation via averaging with the learning-based actionness score, without introducing any additional constraints, i.e., a regularizer, leads to the deterioration in the performance (i.e., reduction in the accuracy of the model to correctly localize the actions in the video. Therefore, a regularizer as an additional constraint is introduced as defined by Equation 2 which reduces the disagreement between the learning-based action score, $a_{fg}$, and the Gaussian mask-based actionness score, $a_{gauss}$, for each video clip by minimizing the square of the difference between the two (i.e., the Euclidean distance). In some example implementations, the actionness consistency loss, $\mathcal{L}_{con}$, is minimized to reduce disagreement between output of the learning-based actionness model 302 and the Gaussian prior-based actionness model 304. As indicated in FIG. 3, the learning-based actionness scores 306 and the masked foreground actionness scores 308 are averaged by an averaging algorithm 312 incorporating the actionness consistency loss 310, $\mathcal{L}_{con}$, of Equation 2 to obtain the final actionness scores 314 (which are the actionness scores 214 in FIG. 2).

For training, only the video-level labels, y, are accessible. Therefore, the base WTAL model 208 may be trained using a multiple instance learning (MIL) based classification loss. To this end, first, the CAS scores 216, q, are enhanced by taking a Hadamard product 218 with the class-agnostic foreground actionness scores 214, $a_{fg}$. Next, topK selection is performed, followed by average pooling across the temporal dimension to obtain the video-level foreground classification logits, $\hat{y}_{fg}$. These operations may be mathematically combined as a single algorithm:

$$\hat{y}_{fg} = 1/K \sum_{k=1}^{K} topK(a_{fg} \odot q), \tag{3}$$

where $\odot$ is the Hadamard product operator. $a_{fg}$ and q are vectors representing the foreground actionness scores and class-activation scores respectively. The Hadamard product multiplies the elements of these vectors at each position to output a new vector having the same number of elements as $a_{fg}$ and q which is equal to T video clips. The topK( ) operation selects the k largest elements out of the resulting vector of the Hadamard product. Finally, $1/K \Sigma_{k=1}^{K}$ takes the average of these K elements and the result is equal to $\hat{y}_{fg}$. Since q is generated for each class (plus a background class), this operation is repeated for each q, generating $\hat{y}_{fg}(c)$ for each class c. $\hat{y}_{fg}(c)$ represents the prediction confidence of the model for each action class and additional background class.

Finally, cross-entropy foreground loss may be used to optimize the network parameters as, $$\mathcal{L}_{fg} = -\sum_{c=1}^{C+1} y(c)\log\hat{y}_{fg}(c). \tag{4}$$

$\mathcal{L}_{fg}$ represents the cross-entropy foreground loss between the prediction confidence of the model and the ground truth for each video. y(c) is 1 when action c is present in the video and 0 when the action c is not present in the video. log $\hat{y}_{fg}(c)$ computes the natural logarithm of $\hat{y}_{fg}(c)$. $\Sigma_{c=1}^{C+1}$ adds the product of y(c)log $\hat{y}_{fg}(c)$ over all action classes plus the background class and represents the cross-entropy between prediction and ground truth. As indicated, $\mathcal{L}_{fg}$ is equal to negative of the cross-entropy such that when cross-entropy is maximized, the loss is minimized.

While the foreground loss, $\mathcal{L}_{fg}$, in Equation 4 can help to localize the desired action snippets, the base WTAL model 208 still underperforms due to the absence of any explicit loss to reduce false positives. Therefore, complimentary labels, $y_{bg}$, may be generated by setting the background class to 1 and all other action classes to 0 in y. Next, video-level background logits, $\hat{y}_{fg}$ may be obtained such that $$\hat{y}_{bg} = 1/K \sum_{k=1}^{K} \text{topK}(a_{bg} \odot q), $$

where $a_{bg}$ is the background actionness score. After that, a background loss. $\mathcal{L}_{bg}$, may be computed in the following manner, $$\mathcal{L}_{bg} = -\sum_{c=1}^{C+1} y_{bg}(c)\log\hat{y}_{bg}(c). \tag{5}$$

Equation 5 complements Equation 4 by applying cross-entropy loss on the background prediction. Just as $\hat{y}_{fg}$ is computed by averaging the topK( ) elements of $a_{fg} \odot q$, $\hat{y}_{bg}$ is computed by averaging the topK( ) elements of $a_{bg} \odot q$. This is done for each class including the background class. Finally, Equation 5 computes the cross-entropy background loss $\mathcal{L}_{bg}$ as the negative sum$-\Sigma_{c=1}^{C+1}$ of the product $y_{bg}(c)$ log $\hat{y}_{bg}(c)$. $y_{bg}(c)$ is equal to 0 for all action classes, c, and 1 for the background class.

While temporal dynamics is important for temporal action localization, it is also understood that spatial information can be a strong cue for recognizing actions. The background MIL loss, $\mathcal{L}_{bg}$, may thus be optimized by incorporating a foreground action-specific scene prior. In typical MIL-based WTAL systems, the background loss is computed on the least probable video clips. However, it is expected that even the least probable video clips contain foreground-related information. Therefore, instead of encouraging the model to predict only background class on the least probable video clips, the base WTAL model 208 is weighted to also predict the appropriate foreground class as the second most dominant class.

Figure 4:
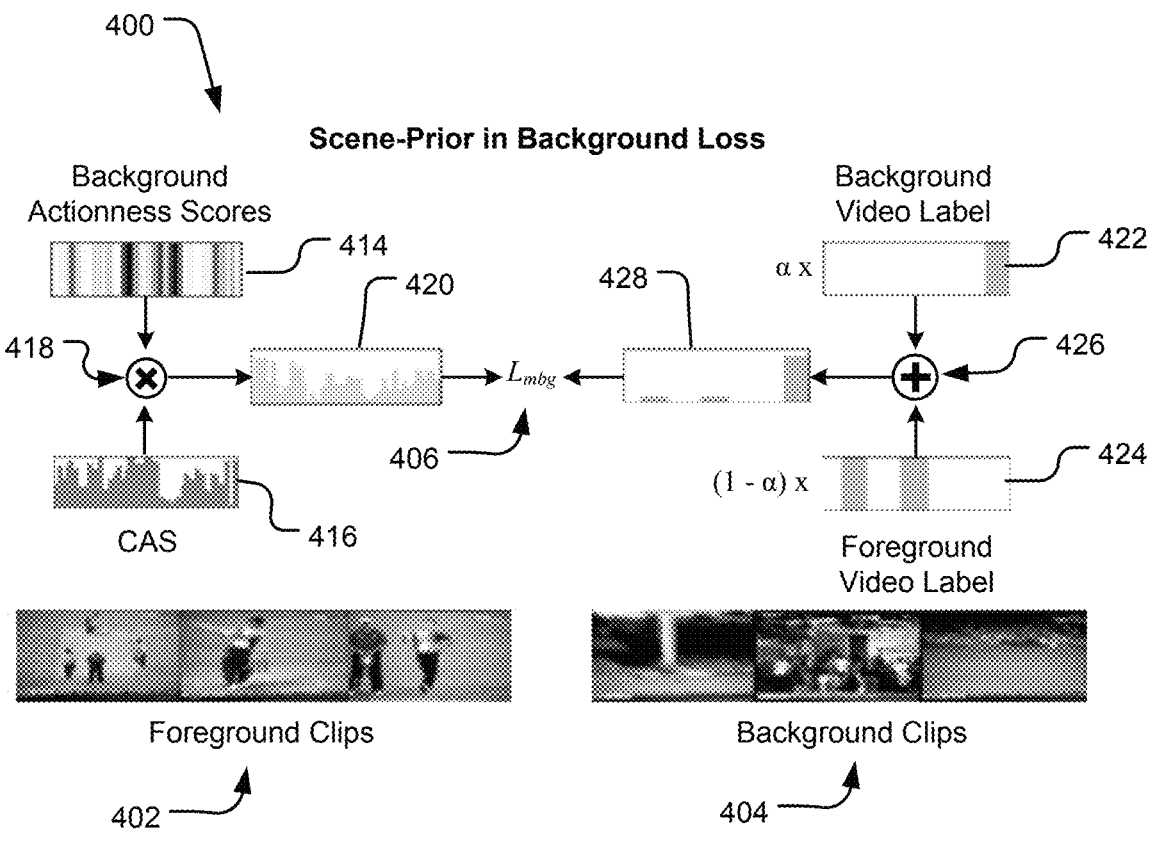
FIG. 4 illustrates example of a second algorithmic sub-process of the training of FIG. 2.

A composite background label, $\tilde{y}_b$, which contains foreground-specific information, may be generated for such foreground weighting as depicted in FIG. 4. A visual example of the benefit of foreground weighting is represented by comparison of the example foreground clips 402 and the example background clips 404 in the schematic 400 of FIG. 4. The foreground clips 402 depict action at a cricket match (Cricket Bowling and Cricket Shot) while the background clips 404 depict images of the pitch and fans in the stadium. As should be apparent, the images of the pitch in the background clips 404 are relevant to the actions of interest in the foreground clips 402 while the images of the fans in the stands are not. In one implementation, background actionness scores 414, separated from the composite actionness score 214, are used to isolate background-specific CAS scores 420 from the CAS scores 416, e.g., by an operation 418 that applies the background actionness scores 414 as a weight to temporally equivalent CAS scores 416. Composite background label values 428 are created by multiplying the background video label values 422 by a weighting coefficient, α, where 0<α<1, multiplying the foreground video label values 424 by a complementary weighting coefficient], (1−α), and adding the resulting weighted values. The modified background label values 428 maintain a high level of background label values, but are thereby injected with low level foreground label values, i.e., action-specific scene prior, to create a modified background MIL loss, $\mathcal{L}_{mbg}$.

Thus, the modified background loss, $\mathcal{L}_{mbg}$, with scene prior is formulated as, $$\tilde{y}_{bg} = \alpha y_{bg} + (1 - \alpha)y, \tag{6}$$

$$\mathcal{L}_{mbg} = -\sum_{c=1}^{C+1} \tilde{y}_{bg}(c)\log\hat{y}_{bg}(c), \tag{7}$$

where, α controls the strength of the background label. Equation 6 modifies the background label to generate a composite background label $\tilde{y}_b$, which is a weighted combination of background label $y_{bg}$ and foreground label y. In this weighted combination, α is used as weighting coefficient for $y_{bg}$ and, similarly, (1−α) is used as weighting coefficient for y. This weighting is performed on the background and foreground labels for each class (i.e., C action classes plus one background class) to result in $\tilde{y}_{bg}(c)$. Equation 7 modifies Equation 5 by replacing $y_{bg}(c)$ with $\tilde{y}_{bg}(c)$ and the output of the equation is the background MIL loss, $\mathcal{L}_{bg}$.

Finally, the base WTAL model 208 is optimized, as shown in FIG. 2, using the combined loss, $\mathcal{L}_{base} = \mathcal{L}_{fg} + \mathcal{L}_{mbg}$. Recall that in determining the actionness scores 214, 314, an actionness consistency loss 310, $\mathcal{L}_{con}$, was introduced. Therefore, the overall loss to train the base WTAL model 208 is $$\mathcal{L}_{base} = \mathcal{L}_{fg} + \mathcal{L}_{mbg} + \mathcal{L}_{con} \tag{8}$$

Equation 8 sums the three losses, $\mathcal{L}_{con}$, $\mathcal{L}_{fg}$, and $\mathcal{L}_{mbg}$ (computed in Equations 2, 4, and 7 respectively) to obtain the total loss, $\mathcal{L}_{base}$, which is used to optimize and train the neural network of the base WTAL model 208.

As indicated by Equations 4 and 5, the base WTAL model 208 does not train for localization, but instead trains for classifying the clips, g, to predict the CAS scores 216. Since the final objective is to generate action snippets, $\mathbb{A}$, containing explicit start and end times along with the action label, the modified CAS scores 224 need to be converted to action snippets, $\mathbb{A}$. However, this is a non-trivial task since the output of the base WTAL model 208 cannot directly output action snippets. The base WTAL model 208 lacks any explicit notion of action boundaries and has no means to aggregate the modified CAS scores 224 to form action snippets, $\mathbb{A}$. Moreover, the priors are introduced after training of the actionness model 210 and the classifier model 212 of the base WTAL model 208 and cannot influence model optimization.

To overcome this inadequacy in the base WTAL model 208, the snippet generator 226 introduces the manual priors through post processing to transform modified CAS scores 224, q, into action snippets, $\mathbb{A}$. These priors make it possible to deal with the under-constrained task of action localization with weak supervision and play a significant role in the downstream performance. The transformation involves multiple steps. First, the modified CAS scores 224 are converted to binarized CAS scores with a broad range of thresholds via the binarization algorithm 230. This is followed by generating connected components from the binarized to form a set of initial action snippets 230$a$-$n$ (depicted with actionness scores for the frames within the initial action snippets 230$a$-$n$). Next, morphological grouping and refinement algorithms 232 (such as erosion and dilation) are applied to refine the action snippet boundaries, resulting in bounded initial action snippets 232$a$-$n$. Further, a non-maximum suppression (NMS) operation is performed to obtain the best candidates for action snippets, $\mathbb{A}$. Finally, a normalization and confidence propagation algorithm 236 is applied to the action snippet candidates to create action snippets, $\mathbb{A}$, that are "confidence-aware," i.e., have a confidence score ascribed to each of the action snippets, $\mathbb{A}$. In the context of the method 200, the action snippets, $\mathbb{A}$, generated by the snippet generator 226 are hereinafter referred to as pseudo-action snippets 238 for reasons set forth below.

While the snippet generator 226, SG, does generate action snippets, $\mathbb{A}$, from the base WTAL model 208 outputs, i.e., the modified CAS scores 224, q, such that q$\mapsto \mathbb{A}$, it does so through post processing rather than directly via a trained model. Notably, the pseudo-action snippets 238 are generated from a base WTAL model 208 that focuses on discriminative parts of actions due to localization-by-classification and tends to err, especially when the visual information around action boundaries is ambiguous. Therefore, it is reasonable to conclude that injecting priors into a WTAL model can address such failure cases and improve on the quality of the extracted pseudo-action snippets 238.

One straightforward way to incorporate the priors encoded by the snippet generator 226, SG, into a WTAL method is to perform self-training with the generated hard pseudo-action snippets 338 so that the WTAL model can explicitly learn the action boundaries. However, this strategy is also not optimal since some of the pseudo-action snippets 238 generated using manual priors will be noisy. One way to deal with this noise is to incorporate a denoising mechanism into training. However, this requires incorporating additional components into the design, for example, multiple networks, sample selection, and subsequent semi-supervised training, among others.

To address this, the method 200 introduces prior-driven weak localization by integrating action snippet generation prior, in the form of the pseudo-action snippets 238 determined by the snippet generator 226, into training of a second WTAL model, referred to as the prior-driven localization model 240. In this way, the method 200 leverages both human priors and the distilled knowledge from the available video-level weak annotations. The prior-driven localization model 240 is self-trained with the pseudo-action snippets 238, $\mathbb{A}$, generated with SG, and also utilizes the confidence values of the pseudo-action snippets 238, $\mathbb{A}$, obtained from the base WTAL model 208. The confidence predictions are propagated by setting the confidence of a pseudo-action snippet 238 as the average of the confidence scores within the span of the pseudo-action snippet 238. This "confidence-aware," self-training strategy based on pseudo-action snippets 238, $\mathbb{A}$, takes advantage of both weak annotations and human priors. However, neural network predictions are not well calibrated and tend to be overconfident, especially on the easy classes. Therefore, a straightforward confidence propagation from the base WTAL model 208 to the action snippets may not be optimal for the relatively harder and underrepresented classes. To address this issue, the predictive confidence scores for each class may be normalized independently.

As described above with respect to FIG. 2, the base WTAL model 208 incorporates three main components: (i) class-agnostic actionness score generation, (ii) foreground MIL loss ($\mathcal{L}_{fg}$), and (iii) background MIL loss ($\mathcal{L}_{bg}$). The actionness score generation and the background MIL loss are added to complement the foreground MIL loss. To address the noted potential confidence issues, two or more additional loss terms besides the MIL-based classification loss, $\mathcal{L}_{MIL}$, may be incorporated into the training of the prior-driven localization model 240. Such loss terms may include a focal loss, $\mathcal{L}_{focal}$, and a distance intersection over union (DIoU) based regression loss, $\mathcal{L}_{DIoU}$.

A focal loss, $\mathcal{L}_{focal}$, for per-clip action classification may be used in conjunction with the classification loss, $\mathcal{L}_{MIL}$, in training the classifier model 242 in the prior-driven localization model 240, where the target is derived from the pseudo-action snippets 238. Focal loss weighting addresses class imbalance problems by assigning more weight to hard or easily misclassified examples (e.g., background with noisy texture or partial object or the object of interest) and less weight to easy examples. Additionally, a distance intersection over union (DIoU) based regression loss, $\mathcal{L}_{DIoU}$, may be used in the training of the regression model 244 of the prior-driven localization model 240 to determine the action boundaries in an anchor-free manner, such that the action offsets from each time step may be predicted. IoU is a metric used to evaluate machine learning algorithms by estimating how well a predicted mask or bounding box matches the ground truth data by levels of intersection and union of the boxes to the truth data. DIoU incorporates the normalized distance (D) between the predicted box and the target box. The target for the regression loss, $L_{DIoU}$, is also derived from the pseudo-action snippets 238. Therefore, the overall "localization-by-localization" training objective with the pseudo-action snippets 238 is as follows:

$$\mathcal{L}_{loc} = \mathcal{L}_{focal} + \mathcal{L}_{DIoU} + \mathcal{L}_{MIL}. \tag{9}$$

Once trained, the direct output of the prior-driven localization model 240 on clips from video files 202 is a set of action snippets 254, with start and end times and action labels, of high confidence determined at a video level rather than at a frame level.

It may be appreciated that the method for implementing example implementation of the prior-driven algorithm disclosed herein need not be limited in application to identification of video segments. Rather, the method may be used to train a temporal attribute localization classifier for identification of attributes of interest in any type of sequential and temporal data file. While video is a primary example of a sequential and temporal data file, other data types meet such a description or definition, for example, audio files; combined audio-video files; closed captioning, subtitle, and description data; textual data; sequential data interleaving and/or combining text with images, videos, and/or audio; continuous sensor data; and others. In the context of the method, attributes can be sequences of action as in video, but can also be defined by other commonalities in data across a sequence of data blocks within the data file. For example, attributes of interest could include certain sequences of narrow frequency ranges, peaks in frequencies with respect to background levels, particular tones or gain levels, or repeating sonic patterns within a music data file. As another example, attributes of interest could be attributes of interest could be certain words or phrases within subtitles to a video file. As a further example, attributes of interest could be sequences of data blocks with sensor data of interest, e.g., temperature spikes, gas emissions exceeding thresholds, etc.

With this understanding, FIG. 5 depicts an example flow diagram of a method 500 for training a temporal attribute localization classifier to identify attributes of interest in any type of sequential and temporal data file. In an initial ingesting operation 502, a training data file having training data therein characterized by both sequential and temporal characteristics is ingested into a machine learning model. The training data file includes attributes of interest for identification. In an identifying operation 504, attribute characteristics of the attributes of interest are identified within data blocks of the training data. The attribute characteristics correspond to known attribute classes. In a first determining operation 506, an attribute-based score for each of the data blocks is determined based upon the attribute characteristics identified within each of the data blocks. In a second determining operation 508, a class activation sequence score for each of the data blocks is determined based upon a presence or an absence of the attribute characteristics within each of the data blocks. Next, in a producing operation 510, one or more base confidence predictions of temporal locations of attributes of interest within the data file are produced by correlating each of the attribute-based scores with corresponding class activation scores for each of the data blocks. Then, in a generating operation 512, a training class of ground-truth attributes corresponding to sequences of data blocks with attribute characteristics corresponding to attributes of interest is created based upon the base confidence predictions. Additionally, in a training operation 514, a classifier is trained with the training class to identify attributes of interest at a file level. Finally, in a second identifying operation 516 sequences of data blocks within a different data file that exhibit the attributes of interest by processing the different data file with the classifier at the file level.

Figure 6:
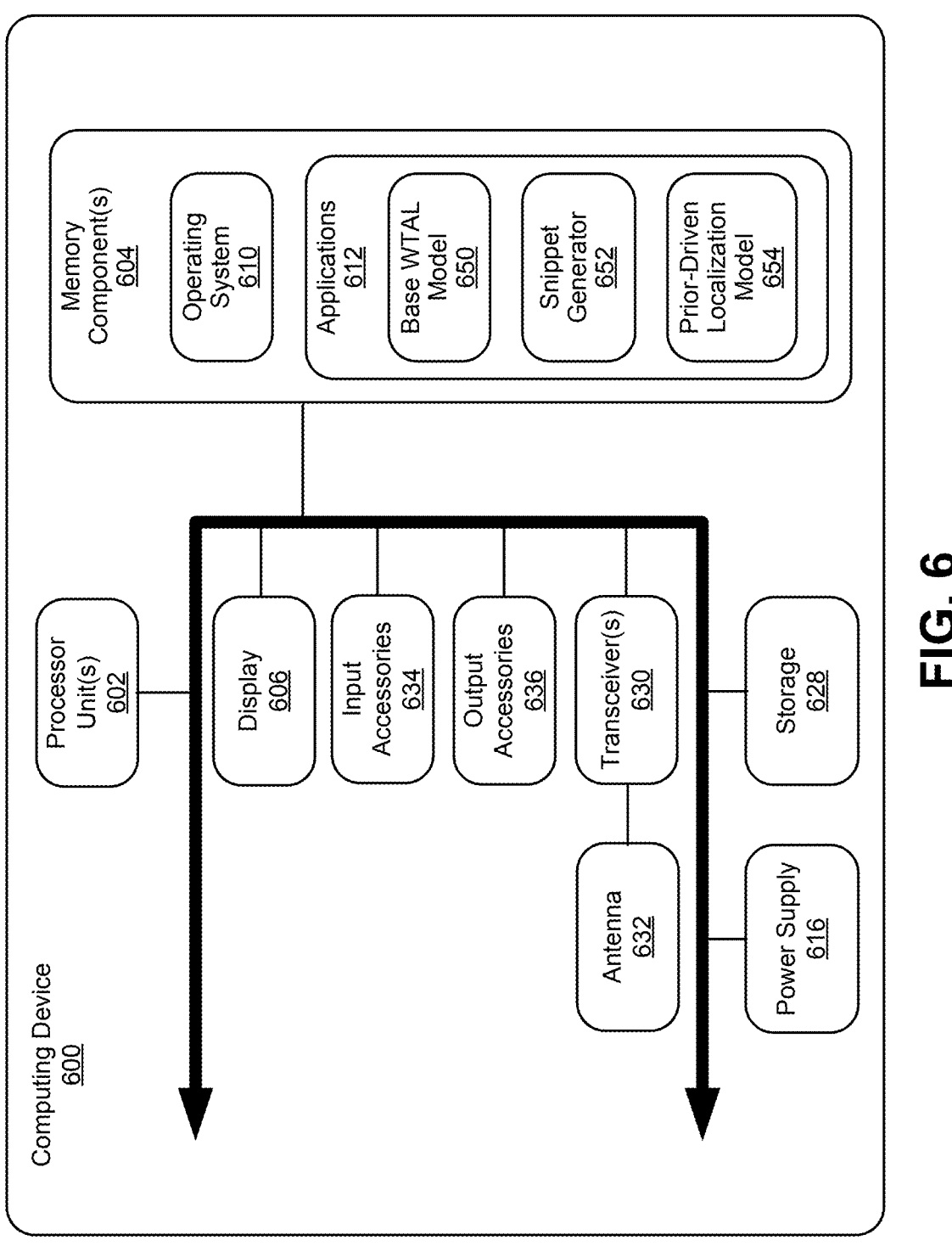
FIG. 6 illustrates an example schematic diagram of a computing device suitable for implementing aspects of the disclosed technology.

FIG. 6 illustrates an example schematic of a computing device 600 suitable for implementing aspects of the disclosed technology including providing a system for implementation of the various machine learning models and classifiers forming the method 200 as described above. The computing device 600 is represented generally and may be understood to encompass multiple different computing devices 600 specifically configured to implement various aspects of the technology in different components of the system. For example, the computing device 600 may be configured for processing large video files or other sequential and temporal data files. In some examples, one or more computing devices 600 are provided for an on-premises computing solution. In some examples, one or more computing devices 600 are provided as a cloud computing solution. In some examples, a combination of on-premises and cloud computing solutions are used.

Each computing device 600 may include one or more processor unit(s) 602 and memory components 604. The processor units 602 may include multicore central processing units (CPUs) and specialty processor units such as video or graphics processing units (GPUs). Additionally, or alternatively, the processor units 602 may comprise an application-specific integrated circuit (ASIC), a reduced instruction set computer (RISC) processor, a digital signal processor (DSP), a field-programmable gate array (FPGA), or other programmable logic device, discrete gate or transistor logic, discrete hardware components, or any combination thereof designed to perform the functions described herein.

The memory components 604 generally include both volatile memory (e.g., RAM) and non-volatile memory (e.g., flash memory). An operating system 610, such as the Microsoft Windows® operating system, the Apple macOS operating system, or the Linux operating system, or a different or other specially configured operating system resides in the nonvolatile memory components 604 and is executed by the processor unit(s) 602. The memory components 604 may include the memory of a host device or of an accessory that couples to the host. In an example implementation, the computing device 600 comprises hardware and/or software embodied by instructions stored in the memory components 604 and/or the storage devices 628 and processed by the processor unit(s) 602.

One or more software applications 612 may be stored in the memory components 604 or in a separate storage device 628 and executed under control of the operating system 610 by the processor unit(s) 602. As noted above, depending upon the desired function and location of the computing device 600, one or more of several different applications 612 may be stored on the computing device 600. In the context of the present disclosure, such software applications may include the base WTAL model 650, the snippet generator 652, and the prior driven localization model 654, together implementing the method 200 as previously described herein.

The software applications 612 may receive input from various input accessories 634, e.g., local devices such as a microphone, a camera, a video camera, a keypad, a mouse, a touchscreen, a stylus, a joystick, or the like. The computing device 600 may be connected to a visual display 606, e.g., a video display screen, and may further include various other output accessories 636 including, for example, an audio amplifier and loudspeaker and/or audio jack and a printer. The input accessories 634 may be directly connected to the computing device 600 either wired or wirelessly communicating over a wireless communication network (e.g., using Wi-Fi®, Bluetooth® or near-field communication protocols) with communication transceivers 630 via an antenna 632 to provide network connectivity.

The computing device 600 further includes a power supply 616, which may include one or more batteries or other corded power sources and which provides power to other components of the computing device 600. The power supply 616 may also be connected to an external power source (not shown) that overrides or recharges the built-in batteries or other power sources.

The memory components 604 and storage device 628 of the computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and applications 612 and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Thus, some implementations may comprise an article of manufacture. An article of manufacture may comprise a tangible storage medium to store logic, algorithms, and data. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled and/or interpreted programming language.

The functions described herein may be implemented in hardware, software executed by a processor, firmware, or any combination thereof. If implemented in software executed by a processor, the functions may be stored on or transmitted over as one or more instructions or code on a computer-readable medium. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Logical operations described herein may be implemented as logical steps in one or more computer systems. The logical operations may be implemented as a sequence of processor-implemented steps executing in one or more computer systems and as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

In an example implementation, the techniques described herein relate to a method performed by a computing system for training a classifier model including: ingesting a video clip into an initial classifier that includes actions of interest for identification; identifying action characteristics within frames of the video clip, the action characteristics corresponding to known action classes; determining an actionness score for each of the frames based upon the action characteristics identified within each of the frames; determining class activation sequence (CAS) scores for sequences of the frames based upon a presence or an absence of the action characteristics identified within each of the frames; producing one or more base confidence predictions of temporal locations of actions of interest within the video clip by correlating each of the actionness scores with corresponding class activation scores for each of the frames in the sequences of frames; generating a training class of action snippets corresponding to known ground-truth actions within the video clip based on the one or more base confidence predictions of temporal locations of actions of interest; training a prior-driven classifier with the training class to identify the actions of interest at a video level; and identifying video segments within a different video clip that exhibit the actions of interest by processing the different video clip at a video level with the classifier.

In another example implementation, the method further includes modifying the CAS scores with foreground loss values and background loss values to create modified CAS scores.

In another example implementation, the method further includes weighting the background loss values with foreground video label values.

In another example implementation of the method, declaring one or more video snippets of the video clips further includes converting the modified CAS scores to binarized CAS scores using a binarization algorithm; and forming a set of initial action snippets from respective sequences of the frames based upon the binarized CAS scores.

In another example implementation of the method, declaring one or more video snippets of the video clips further includes applying one or more morphological grouping and refinement algorithms to refine boundaries of the set of initial action snippets.

In another example implementation of the method, converting each of the declared video snippets further includes applying a normalization and confidence propagation algorithm to the initial action snippets to ascribe a confidence score to each of the action snippets corresponding to one of the ground truth actions.

In another example implementation, the method further includes weighting the prior-driven classifier with a focal loss factor.

In another example implementation, the method further includes weighting the prior-driven classifier with a distance intersection over union (DIoU) based regression loss factor.

In an example implementation, the techniques described herein relate to a system including: a computing processor; a memory; a weakly-supervised temporal action localization (WTAL) model stored in the memory and executable by the processor to ingest into a first classifier a video clip that includes actions of interest for identification; identify action characteristics within frames of the video clip, the action characteristics corresponding to known action classes; determine an actionness score for each of the frames based upon the action characteristics identified within each of the frames; determine a class activation sequence score (CAS) for sequences of the frames based upon a presence or an absence of the action characteristics identified within each of the frames; and produce one or more base confidence predictions of temporal locations of actions of interest within the video clip by correlating each of the actionness scores with corresponding class activation scores for each of the frames in the sequences frames; a snippet generator stored in the memory and executable by the processor to generate a training class of action snippets corresponding to known ground-truth actions within the video clip based on the one or more base confidence predictions of temporal locations of actions of interest; and a prior-driven, weakly-supervised temporal action localization model stored in the memory and executable by the processor to train a second classifier with the training class to identify the actions of interest at a video level; and identify video segments within a different video clip that exhibit the actions of interest by processing the different video clip at a video level with the second classifier.

In another example implementation of the system, the WTAL model further includes an actionness model stored in the memory and executable by the processor to determine an actionness score for each of the frames based upon the action characteristics identified within each of the frames.

In another example implementation of the system, the actionness model further includes a learning-based actionness model stored in the memory and executable by the processor to determine foreground actionness scores of the frames; and a Gaussian prior-based actionness model stored in the memory and executable by the processor to apply a Gaussian mask and calculate masked foreground actionness scores of the frames; and wherein the actionness model further combines the foreground actionness scores and the masked foreground actionness scores to determine the actionness score for each of the frames.

In another example implementation of the system, the WTAL model further includes a base classifier model stored in the memory and executable by the processor to generate the CAS scores in parallel with the actionness model.

In another example implementation of the system, the WTAL model is further executable by the processor to modify the CAS scores with foreground loss values and background loss values to create modified CAS scores.

In another example implementation of the system, the WTAL model is further executable by the processor to weight the background loss values with foreground video label values.

In another example implementation of the system, the snippet generator is further executable by the processor to convert the modified CAS scores to binarized CAS scores using a binarization algorithm; and form a set of initial action snippets from respective sequences of the frames based upon the binarized CAS scores.

In another example implementation of the system, the snippet generator is further executable by the processor to apply one or more morphological grouping and refinement algorithms to refine boundaries of the set of initial action snippets.

In another example implementation of the system, the snippet generator is further executable by the processor to apply a normalization and confidence propagation algorithm to the initial action snippets to ascribe a confidence score to each of the action snippets corresponding to one of the ground truth actions.

In another example implementation of the system, the second classifier is weighted with a focal loss factor.

In another example implementation of the system, the second classifier is weighted with a distance intersection over union (DIoU) based regression loss factor.

In in an example implementation, the techniques described herein relate to a method performed by a computing system including ingesting a data file having training data therein characterized by both sequential and temporal characteristics, the data file including attributes of interest for identification; identifying attribute characteristics within data blocks of the training data, the attribute characteristics corresponding to known attribute classes; determining an attribute-based score for each of the data blocks based upon the attribute characteristics identified within each of the data blocks; determining a class activation sequence score for each of the data blocks based upon a presence or an absence of the attribute characteristics within each of the data blocks; correlating each of the attribute-based scores with corresponding class activation scores for each of the data blocks to produce one or more base confidence predictions of temporal locations of attributes of interest within the data file; generating a training class of ground-truth attributes based on the one or more base confidence predictions of temporal locations of attributes of interest within one or more sequences of data blocks within the data file; training a classifier with the training class to identify attributes of interest at a file level; and identifying different sequences of data blocks within a different data file that exhibit the attributes of interest by processing the different data file with the classifier at the file level.

In yet another aspect, some implementations include a computer-readable storage medium for storing computer-readable instructions. The computer-readable instructions, when executed by one or more hardware processors, perform any of the methods described herein.

In a further example implementation, the techniques described herein relate to a system including a computing processing means, a memory means, a snippet generator means, a weakly-supervised temporal action localization (WTAL) model stored in the memory means, and a prior-driven, weakly-supervised temporal action localization model stored in the memory means. The WTAL model is executable by the processing means to instantiate a WTAL means that ingests into a first classifier means a video clip that includes actions of interest for identification; identifies action characteristics within frames of the video clip, the action characteristics corresponding to known action classes; determines an actionness score for each of the frames based upon the action characteristics identified within each of the frames; determines a class activation sequence score (CAS) for sequences of the frames based upon a presence or an absence of the action characteristics identified within each of the frames; and produces one or more base confidence predictions of temporal locations of actions of interest within the video clip by correlating each of the actionness scores with corresponding class activation scores for each of the frames in the sequences frames. The snippet generator means generates a training class of action snippets corresponding to known ground-truth actions within the video clip based on the one or more base confidence predictions of temporal locations of actions of interest. The prior-driven, weakly-supervised temporal action localization model is executable by the processor to instantiate a prior-driven means to train a second classifier means with the training class to identify the actions of interest at a video level and identify to video segments within a different video clip that exhibit the actions of interest by processing the different video clip at a video level with the second classifier.

In another example implementation of the system, the WTAL model further includes an actionness model stored in the memory and executable by the processor means to determine an actionness score for each of the frames based upon the action characteristics identified within each of the frames.

In another example implementation of the system, the actionness model further includes a learning-based actionness model stored in the memory means and executable by the processor means to determine foreground actionness scores of the frames; and a Gaussian prior-based actionness model stored in the memory means and executable by the processor means to apply a Gaussian mask and calculate masked foreground actionness scores of the frames; and wherein the actionness model further combines the foreground actionness scores and the masked foreground actionness scores to determine the actionness score for each of the frames.

In another example implementation of the system, a base classifier model is further stored in the memory means and implemented by the WTAL means to generate the CAS scores in parallel with the actionness model.

In another example implementation of the system, the WTAL means further modifies the CAS scores with foreground loss values and background loss values to create modified CAS scores.

In another example implementation of the system, the WTAL means further weights the background loss values with foreground video label values.

In another example implementation of the system, the snippet generator means further converts the modified CAS scores to binarized CAS scores using a binarization algorithm and forms a set of initial action snippets from respective sequences of the frames based upon the binarized CAS scores.

In another example implementation of the system, the snippet generator means further apples one or more morphological grouping and refinement algorithms to refine boundaries of the set of initial action snippets.

In another example implementation of the system, the snippet generator means further applies a normalization and confidence propagation algorithm to the initial action snippets to ascribe a confidence score to each of the action snippets corresponding to one of the ground truth actions.

In another example implementation of the system, the second classifier means is weighted with a focal loss factor.

In another example implementation of the system, the second classifier means is weighted with a distance intersection over union (DIoU) based regression loss factor.

Several performance advantages may be understood in view of this discussion. In particular, by training a WTAL model to identify action snippets within a video clip at the video level rather than at the frame level, significant reductions in data collection and storage of frame-by-frame attributes are achieved. This results in lower data storage requirements and lower data processing requirements to identify action snippets. Further, a WTAL model trained according to the method for implementation of the prior-driven algorithm disclosed herein, and operating at a video level rather than at a frame level, requires significantly less processing power and fewer resources to identify action snippets in a video clip. Additionally, as noted herein, using a classifier trained with the method also results in greater accuracy in determination of action snippets of interest and corresponding temporal boundaries (3% or greater compared to similar methods using benchmark datasets).

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed. Similarly, the detailed description may include specific details for the purpose of providing an understanding of the described systems, structures, or apparatus. However, it may be that such systems, structures, or apparatus can be implemented without such specific details. For example, in some instances, well-known structures and apparatuses are shown in block diagram form to provide focus to new aspects in the described examples.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples."

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method performed by a computing system for training a classifier model to classify a video clip that includes actions of interest for identification, the method comprising:
identifying action characteristics within frames of the video clip, the action characteristics corresponding to known action classes;
    determining an actionness score for each of the frames based upon the action characteristics identified within each of the frames;
    determining class activation sequence (CAS) scores for sequences of the frames based upon a presence or an absence of the action characteristics identified within each of the frames;
    producing one or more base confidence predictions of temporal locations of actions of interest within the video clip by correlating each of the actionness scores with corresponding class activation scores for each of the frames in the sequences of frames;
    generating a training class of action snippets corresponding to known ground-truth actions within the video clip based on the one or more base confidence predictions of temporal locations of actions of interest; and
    training a prior-driven classifier with the training class to identify the actions of interest at a video level.

2. The method of claim 1 further comprising modifying the CAS scores with foreground loss values and background loss values to create modified CAS scores.

3. The method of claim 2 further comprising weighting the background loss values with foreground video label values.

4. The method of claim 1, wherein declaring one or more video snippets of the video clips further comprises
converting the modified CAS scores to binarized CAS scores using a binarization algorithm; and
forming a set of initial action snippets from respective sequences of the frames based upon the binarized CAS scores.

5. The method of claim 4, wherein declaring one or more video snippets of the video clips further comprises applying one or more morphological grouping and refinement algorithms to refine boundaries of the set of initial action snippets.

6. The method of claim 5, wherein converting each of the declared video snippets further comprises applying a normalization and confidence propagation algorithm to the initial action snippets to ascribe a confidence score to each of the action snippets corresponding to one of the ground truth actions.

7. The method of claim 1 further comprising
weighting the prior-driven classifier with a focal loss factor; or weighting the prior-driven classifier with a distance intersection over union (DIOU) based regression loss factor; or
both.

8. The method of claim 1 further comprising identifying video segments within a different video clip that exhibit the actions of interest by processing the different video clip at a video level with the prior-driven classifier.

9. A system comprising:
a computing processor;
a memory;
a weakly-supervised temporal action localization (WTAL) model stored in the memory and executable by the processor to
    ingest into a first classifier within the WTAL model a video clip that includes actions of interest for identification;
    identify action characteristics within frames of the video clip, the action characteristics corresponding to known action classes;
    determine an actionness score for each of the frames based upon the action characteristics identified within each of the frames;
    determine a class activation sequence score (CAS) for sequences of the frames based upon a presence or an absence of the action characteristics identified within each of the frames; and
    produce one or more base confidence predictions of temporal locations of actions of interest within the video clip by correlating each of the actionness scores with corresponding class activation scores for each of the frames in the sequences frames;
a snippet generator stored in the memory and executable by the processor to
    generate a training class of action snippets corresponding to known ground-truth actions within the video clip based on the one or more base confidence predictions of temporal locations of actions of interest; and
a prior-driven, weakly-supervised temporal action localization model stored in the memory and executable by the processor to train a second classifier with the training class to identify the actions of interest at a video level.

10. The system of claim 9, wherein the WTAL model further includes an actionness model stored in the memory and executable by the processor to determine an actionness score for each of the frames based upon the action characteristics identified within each of the frames.

11. The system of claim 10, wherein the actionness model further includes
a learning-based actionness model stored in the memory and executable by the processor to determine foreground actionness scores of the frames; and
a Gaussian prior-based actionness model stored in the memory and executable by the processor to apply a Gaussian mask and calculate masked foreground actionness scores of the frames; and wherein
the actionness model further combines the foreground actionness scores and the masked foreground actionness scores to determine the actionness score for each of the frames.

12. The system of claim 10, wherein the WTAL model further includes a base classifier model stored in the memory and executable by the processor to generate the CAS scores in parallel with the actionness model.

13. The system of claim 9, wherein the WTAL model is further executable by the processor to modify the CAS scores with foreground loss values and background loss values to create modified CAS scores.

14. The system of claim 13, wherein the WTAL model is further executable by the processor to weight the background loss values with foreground video label values.

15. The system of claim 13, wherein the snippet generator is further executable by the processor to convert the modified CAS scores to binarized CAS scores using a binarization algorithm; and form a set of initial action snippets from respective sequences of the frames based upon the binarized CAS scores.

16. The system of claim 14, wherein the snippet generator is further executable by the processor to apply one or more morphological grouping and refinement algorithms to refine boundaries of the set of initial action snippets.

17. The system of claim 15, wherein the snippet generator is further executable by the processor to apply a normalization and confidence propagation algorithm to the initial action snippets to ascribe a confidence score to each of the action snippets corresponding to one of the ground truth actions.

18. The system of claim 9, wherein the second classifier is weighted with a focal loss factor; or weighted with a distance intersection over union (DIOU) based regression loss factor; or both.

19. The system of claim 9, wherein the prior-driven, weakly-supervised temporal action localization model is further executable by the processor to identify video segments within a different video clip that exhibit the actions of interest by processing the different video clip at a video level with the second classifier.

20. A method performed by a computing system comprising ingesting a data file having training data therein characterized by both sequential and temporal characteristics, the data file including attributes of interest for identification;

identifying attribute characteristics within data blocks of the training data, the attribute characteristics corresponding to known attribute classes;

determining an attribute-based score for each of the data blocks based upon the attribute characteristics identified within each of the data blocks;

determining a class activation sequence score for each of the data blocks based upon a presence or an absence of the attribute characteristics within each of the data blocks;

correlating each of the attribute-based scores with corresponding class activation scores for each of the data blocks to produce one or more base confidence predictions of temporal locations of attributes of interest within the data file;

generating a training class of ground-truth attributes based on the one or more base confidence predictions of temporal locations of attributes of interest within one or more sequences of data blocks within the data file;

training a classifier with the training class to identify attributes of interest at a file level; and identifying different sequences of data blocks within a different data file that exhibit the attributes of interest by processing the different data file with the classifier at the file level.

* * * * *